United States Patent [19]

Holmberg, Jr. et al.

[11] Patent Number: 4,572,488
[45] Date of Patent: Feb. 25, 1986

[54] LOW TEMPERATURE RATE CONTROLLER

[75] Inventors: Arthur Holmberg, Jr., Cypress; Earl M. Altman, Buena Park, both of Calif.

[73] Assignee: The United States of America as represented by the Secretary of the Air Force, Washington, D.C.

[21] Appl. No.: 559,612

[22] Filed: Dec. 8, 1983

[51] Int. Cl.⁴ .............................. F16F 3/07; F16F 9/36
[52] U.S. Cl. ..................... 267/8 R; 188/298; 188/313; 188/322.18; 188/322.19; 267/64.27; 267/122; 267/151
[58] Field of Search ............... 188/298, 312, 316, 318, 188/322.18, 322.19, 322.17, 313; 267/64.19, 64.21, 64.23, 64.24, 64.27, 34, 122, 151, 8 R

[56] References Cited

U.S. PATENT DOCUMENTS

| | | |
|---|---|---|
| 899,001 | 9/1908 | Beck . |
| 1,078,060 | 11/1913 | Newman .......................... 188/318 |
| 1,484,193 | 2/1924 | Scott . |
| 1,567,517 | 12/1925 | Kisbey ........................ 188/312 X |
| 2,349,244 | 5/1944 | Brown .......................... 188/312 X |
| 2,856,857 | 10/1958 | Saalfrank ........................ 103/44 |
| 2,886,142 | 5/1959 | Orshansky ....................... 188/96 |
| 2,942,838 | 6/1960 | Peters .......................... 188/298 X |
| 3,178,913 | 4/1965 | Olson ............................... 68/12 |
| 3,752,270 | 8/1973 | Valdespino ..................... 188/298 X |
| 4,182,441 | 1/1980 | Strong et al. ..................... 188/312 |
| 4,280,600 | 7/1981 | Salmon et al. .................... 188/312 |
| 4,342,884 | 8/1982 | Ban et al. ...................... 188/298 X |

FOREIGN PATENT DOCUMENTS

| | | | |
|---|---|---|---|
| 603566 | 6/1948 | United Kingdom | 188/298 |
| 658532 | 10/1951 | United Kingdom | 188/298 |
| 1175255 | 12/1969 | United Kingdom | 188/298 |

OTHER PUBLICATIONS

Design News, News for Design Engineers.

Primary Examiner—George E. A. Halvosa
Attorney, Agent, or Firm—Donald J. Singer; Stanton E. Collier

[57] ABSTRACT

A rate controller for use in outer space is provided where motion damping occurs by forcing damping fluid from one side of an actuator piston to the other side of the piston through an external line. The damping fluid is totally contained in a sealed system of metallic bellows with no seals required between moving parts and the external environment.

1 Claim, 1 Drawing Figure

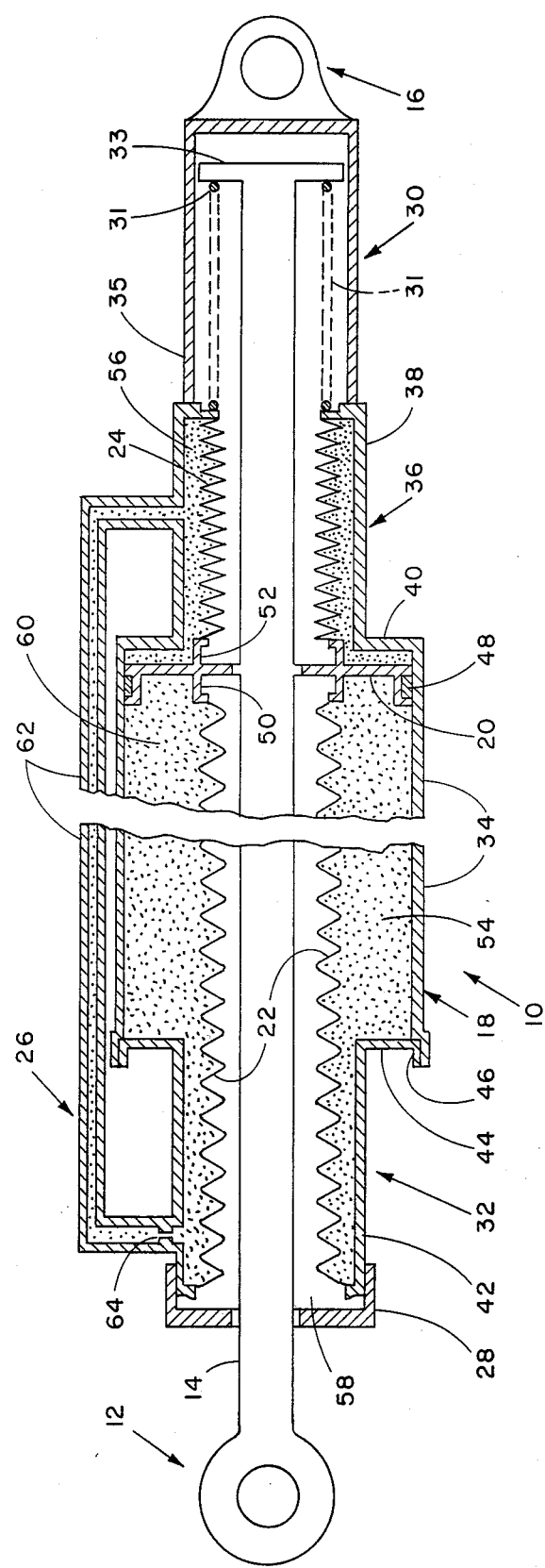

LOW TEMPERATURE RATE CONTROLLER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to shock absorbers, and, more particularly, to shock absorbers that are used in outer space applications.

One type of shock absorber, also called a rate controller, uses a liquid inside such as silicone oil as a damping fluid. Under extreme temperatures, $-200°$ F. to $185°$ F., as found in outer space, almost all conventional fluids are frozen or so viscous that they are unuseable at the lower temperature end. One could use the above type damping fluid, but heaters would be needed and this would increase both weight and energy requirements.

A gaseous fluid could also be used, but there are no conventional dynamic shaft hermetic seals able to work in such an environment because of the high vacuum of space and temperature extremes experienced there.

These drawbacks have motivated a search for a device capable of functioning in outer space.

SUMMARY OF THE INVENTION

The instant invention sets forth a rate controller that overcomes the problems set forth above.

The present invention uses a pair of flexible metal bellows sealed to a piston and a housing by continuous welds. A gas occupies sealed volumes external to the bellows on either side of the piston and is metered through a resistive channel to that volume on the opposite side of the piston. A center volume between these volumes is open to the external environment. This center volume, in a typical shock absorber, internal to the two bellows is filled with a damping fluid. An actuator rod is attached to the piston and one end is attached to a load while the other end is attached to a stable platform. A spring that is used to drive the load in a given direction is attached to the rod and motion thereof is damped by the rate controller.

One object of the present invention is to provide a rate controller that functions as a shock absorber in outer space.

Another object of the present invention is to provide a rate controller that is hermetically sealed.

These and many other objects and advantages of the present invention will be readily apparent to one skilled in the pertinent art from the following detailed description of a preferred embodiment of the invention and the related drawing.

BRIEF DESCRIPTION OF THE DRAWING

The only FIGURE is a cross section of the rate controller of this invention.

DETAILED DESCRIPTION OF THE PREFERRED EMBODIMENT

Referring to the FIGURE, a rate controller 10 is shown in cross section.

A workpiece, not shown, is attached to an eye bracket 12 that is connected to a movable actuator rod 14. A mounting base, not shown, is attached to a housing bracket 16. The workpiece and the mounting base translate relative to each other and the relative motion is damped by rate controller 10. Since rate controller 10 is designed to work in outer space, the workpiece can be a solar panel or an antenna, for example, and the mounting base can be a satellite body, for example.

Rate controller 10 is constructed of a cylindrical housing 18, actuator rod 14, a guide 28, a piston 20, a left bellows 22, a right bellows 24, and a fluid resistor 26. A spring actuator 30 causes rod 14 to move to the left upon its release.

Housing 18 has a left housing 32, a center housing 34 and a right housing 36. Center housing 34 serves as a piston sleeve and is shaped like a cylindrical tube. Left housing 32 and right housing 36 are similarly shaped like a top hat without a cover. Right housing 36 has a cylindrical tube 38 attached to a brim 40. Because of assembly requirements, right housing 36 can be an integral part of center housing 34. Left housing 32 has a cylindrical tube 42 and a brim 44 like right housing 36 but also has a lip 46 which is welded to center housing 34 after the insertion of piston 20.

Piston 20 centers rod 14 in center housing 34 and a sliding seal 48 attached to piston 20 is designed to force a gas 60 between a left volume 54 and a right volume 56 and minimize any leakage by seal 48. A left annular ring 50 and a right annular ring 52 are concentrically positioned on piston 20 and serve as mounting flanges for bellows 22 and 24.

Left bellows 22 being made of gas impermeable material, preferably stainless steel, is welded to the top of tube 42 and to ring 50 creating left volume 54. Right bellows 24, similar in structure to bellows 22, is circumferentially welded to the top of tube 38 and ring 52 creating right volume 56. Because of the above welds, volumes 54 and 56 are hermetically sealed from an external environment 58 which, in the conventional shock absorber, is typically filled with a damping fluid that moves to the different sides of piston 20 absorber.

Damping fluid, gas 60, is placed in volumes 54 and 56. Fluid resistor 26 resists the flow of gas 60 between volumes 54 and 56 when piston 20 moves and thus slows the movement of rod 14. Fluid resistor 26 could be placed in piston 20 but then it would be inaccessible to change or adjustment. Fluid resistor 26 has a line 62 connected to tube 36 and 42. A metering orifice 64 is placed in line 62 to resist fluid movement between volumes 54 and 56. A small amount of gas 60 may pass over sliding seal 48, but this must be insignificant compared to the amount passing through fluid resistor 26.

From the above, it is seen that there can be no gas 60 leakage to external environment 58 since volumes 54 and 56 are welded at all joints. Conventional shock absorbers require fluid seals where rod 14 exits from guide 28. Guide 28 is attached to the top of tube 42 and serves only as a traveling guide for rod 14 and piston 20.

Spring actuator 30 has a spring 31 attached to tube 38 and to a cap 33 of rod 14. Upon a given command, spring 31 is released from rest and biases rod 14 to the left and thus extends rod 14 from guide 28 to deploy the movable workpiece attached to eye bracket 12. A spring housing 35 is attached to tube 38 by welding, for example.

Other configurations of housing 18 are possible but they must hermetically seal the damping gas 60 from external environment 58; otherwise, in outer space, gas 60 would eventually leak out because of the high pressure differential and inadequate mechanical seals.

Clearly, many modifications and variations of the present invention are possible in light of the above teachings and it is therefore understood, that within the scope of the inventive concept, the invention may be practiced otherwise than as specifically described

What is claimed is:

1. A rate controller for use in outer space, said rate controller comprising:

first housing means for containing a damping fluid, said first housing means having a left housing, a center housing, and a right housing, said housings hermetically connected together, said left and said right housing being shaped like a cylindrical tube with a brim thereon, said center housing being shaped like a cylindrical tube, said cylindrical tube of said center housing being connected to said left housing on said brim and said right housing on said brim;

second housing means for connecting said first housing means to a bracket attached to said second housing means, said second housing means fixedly attached to said right housing opposite to said brim thereon;

a piston, said piston in sliding contact with said center housing of said housing means, said piston having a sliding seal mounted circumferentially about said piston and in sealing contact with said center housing, said piston having mounting means on opposite sides thereof and centered thereon;

an actuator rod, said rod fixedly attached to said piston, said rod passing through said first housing means and connected to an eye bracket, said eye bracket connected to a workpiece;

a spring for biasing said piston, said spring being mounted within said second housing means, said actuator rod having a spring retaining bracket mounted thereon, said spring mounted between said spring retaining bracket and said first housing means;

a rod guide, said guide connected to said first housing means, said rod closely fitting through a hole centered in said rod guide;

bellow means for forming flexible gas impermeable walls, said bellow means attached to said piston and said left housing and said piston and said right housing, whereby left and right volumes are formed, said volumes being hermetically sealed from said external environment, said bellow means being a pair of metal bellows, one of said pair being a left bellows, said left bellows having said rod therethrough, one end of said left bellows being hermetically attached to said first housing means of said left housing, the other end of said left bellows being hermetically sealed to a left mounting means attached to said piston, the other of said pair being a right bellows, said right bellows having said rod therethrough, one end of said right bellows being hermetically attached to said first housing means of said right housing, the other end of said right bellows being hermetically sealed to a right mounting means attached to said piston, said left volume being hermetically sealed from said external environment, said left volume being defined by the external wall of said left bellows, said left housing, said center housing, and said piston, and said right volume being hermetically sealed from said external environment, said right volume being defined by the external wall of said right bellows, said right housing, said center housing, and said piston; and a fluid resistor, said fluid resistor connected between said left volume and said right volume whereby the movement of said piston causes said damping fluid to flow through said fluid resistor to resist rapid motion of said piston; said fluid resistor having a pneumatic line with an orifice therein to resist the flow of said damping fluid therethrough, said line being connected between said left and said right volumes, and said line being externally mounted to said first housing means.

* * * * *